United States Patent
Shmulovich

(10) Patent No.: US 6,628,876 B1
(45) Date of Patent: Sep. 30, 2003

(54) METHOD FOR MAKING A PLANAR WAVEGUIDE

(75) Inventor: Joseph Shmulovich, Murray Hill, NJ (US)

(73) Assignee: TriQuint Technology Holding Co., Hillsboro, OR (US)

( * ) Notice: Subject to any disclaimer, the term of this patent is extended or adjusted under 35 U.S.C. 154(b) by 226 days.

(21) Appl. No.: 09/663,013

(22) Filed: Sep. 15, 2000

(51) Int. Cl.[7] ............................. G02B 6/10; H01L 21/00
(52) U.S. Cl. ......................... 385/129; 385/131; 438/31
(58) Field of Search ................................. 385/129–131; 438/22, 31; 65/386, 429, 390; 264/1.24, 1.27; 216/24

(56) References Cited

U.S. PATENT DOCUMENTS

| | | | | |
|---|---|---|---|---|
| 4,789,642 A | * | 12/1988 | Lorenzo et al. | ............... 438/31 |
| 5,500,916 A | * | 3/1996 | Cirelli et al. | .................. 385/37 |
| 2002/0018636 A1 | * | 2/2002 | Bischel et al. | .............. 385/140 |
| 2002/0064896 A1 | * | 5/2002 | Zhao et al. | .................... 438/31 |

\* cited by examiner

*Primary Examiner*—Loha Ben
*Assistant Examiner*—William Choi
(74) *Attorney, Agent, or Firm*—Lowenstein Sandler PC

(57) ABSTRACT

The present invention is a method for making planar waveguides. The method comprises the steps of providing a workpiece comprising a layer of material suitable for the wave guide strip; patterning the layer so that the workpiece comprises, a base portion and the at least one protruding portion; forming a cladding layer on the protruding portion; and attaching the cladding layer to a substrate. Depending on the composition of the workpiece, the process may further require removing the base portion to expose the bottom surface of the protruding portion. With this method, a planar waveguide or a planar waveguide amplifier may be fabricated having thickness dimensions greater than 5 $\mu$m, or more preferably, in the range of 10–20 $\mu$m.

13 Claims, 3 Drawing Sheets

METHOD FOR MAKING A PLANAR WAVEGUIDE

FIELD OF THE INVENTION

The present invention relates to a method for making planar waveguides having relatively large thickness dimensions. The invention is useful in fabricating planar waveguide arrays and planar waveguide amplifiers for communications systems.

BACKGROUND OF THE INVENTION

Optical communications systems can transmit optical signals over long distances at high speeds. An optical signal is transmitted from a light source to a waveguide and ultimately to a detector. Waveguide structures such as optical fibers transmit the light signals. Basically, a waveguide structure comprises an inner core region fabricated from a material having a certain index of refraction, and an outer cladding region contiguous the core comprised of a material having a lower index of refraction. A light beam propagated along the core will be guided along the length of the waveguide by total internal reflection.

Planar waveguides are flat waveguide structures that guide light in essentially the same way as optical fibers. A planar waveguide structure comprises a higher index core strip of material (the "waveguide strip") embedded in a lower index substrate.

Optical communication systems typically include a variety of devices (e.g., light sources, photodetectors, switches, optical fibers, amplifiers, and filters). Amplifiers and filters may be used to facilitate the propagation light pulses along the waveguide.

The connections between the various system components inherently produce loss in optical communication systems. For example, in planar waveguide amplifiers it would be desirable, to couple planar waveguides with a multimode signal collection fiber. However, applying; conventional processing, planar waveguide amplifiers typically cannot be ma de with cores that are more than about 5 $\mu$m thick, and conventional sputtered films have a thickness of about 2–3 $\mu$m. On the other hand, a multimode signal collection fiber has a core that is typically more than 50 $\mu$m in diameter. This mismatch in vertical dimension makes it very difficult to efficiently couple light from a multimode signal collection fiber to a planar waveguide. Losses can amount to up to 17 dB or in some cases up to~97 to 98 percent of the transmitted light.

Many other factors also contribute to losses in waveguide connections. Such factors include overlap of fiber cores, misalignment of the fiber axes, fiber spacing, reflection at fiber ends, and the numerical aperture (NA) mismatch. If a fiber receiving light has a smaller NA than a fiber delivering the light, some light will enter the receiving fiber in modes that are not confined to the core and will leak out of the fiber. The loss can be quantified by the formula: Loss (dB)=10 $\log_{10} (NA_2/NA_1)^2$. Thus, significant losses can occur if fibers are mismatched and signals are traveling from a large core into a smaller core.

With the increasing demand for efficient, large-scale manufacturing of hybrid integrated opto-electronic devices, there is a need to more efficiently couple various waveguide devices together while minimizing losses.

SUMMARY OF THE INVENTION

The present invention is a method for making planar waveguides. The method comprises the steps of providing a workpiece comprising a layer of material suitable for the waveguide strip; patterning the layer so that the workpiece comprises a base portion and the at least one protruding portion; forming a cladding layer on the protruding portion; and attaching the cladding layer to a substrate. Depending on the composition of the workpiece, the process may further require removing the base portion. With this method, a planar waveguide or a planar waveguide amplifier may be fabricated having thickness dimensions greater than 5 $\mu$m, or more preferably, in the range of 10–20 $\mu$m.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for the purposes of illustrating the concepts of the invention and are not to scale.

DETAILED DESCRIPTION OF THE INVENTION

Figure 1:
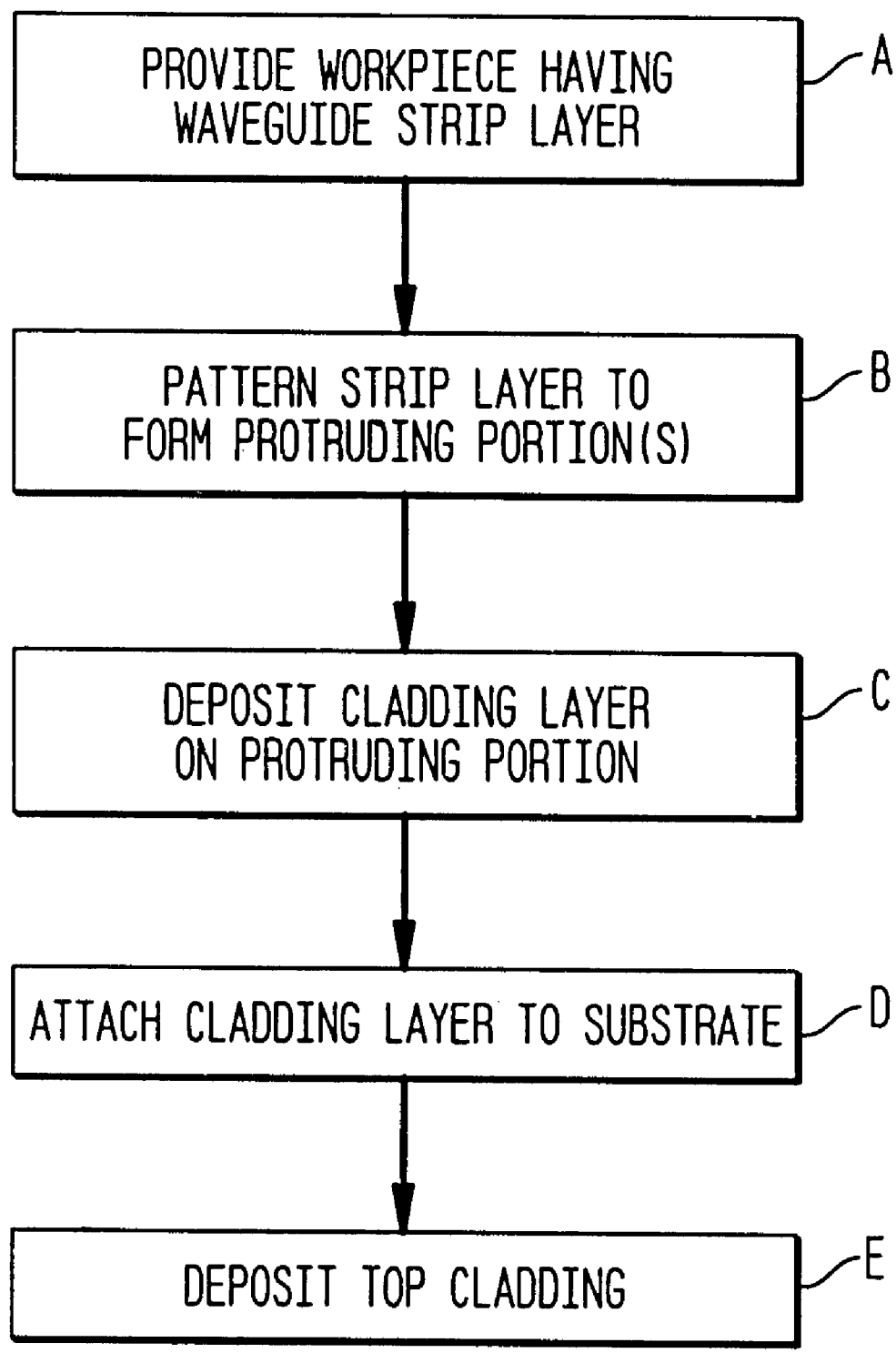
FIG. 1 is a block diagram showing steps of the inventive method.

Referring to the drawings, FIG. 1 is a schematic block diagram showing the steps in making a planar waveguide. As shown in Block A of FIG. 1, the first step is to provide a workpiece comprising a layer of material suitable for the waveguide strip. The workpiece can be a bulk disk of the strip material or a substrate-supported layer of the strip material. The layer, if desired, can exceed the thickness of the waveguide strip to be formed.

The next step, shown in Block B is to pattern the layer of strip material to form at least one protruding portion corresponding in dimension to a waveguide strip to be fabricated. The patterning can be conveniently, effected by photolithography, masking one or more protruding strips and etching the unmasked material as by wet etching Preferably a plurality of protruding portions are patterned to produce an array of waveguides.

Figure 2A:
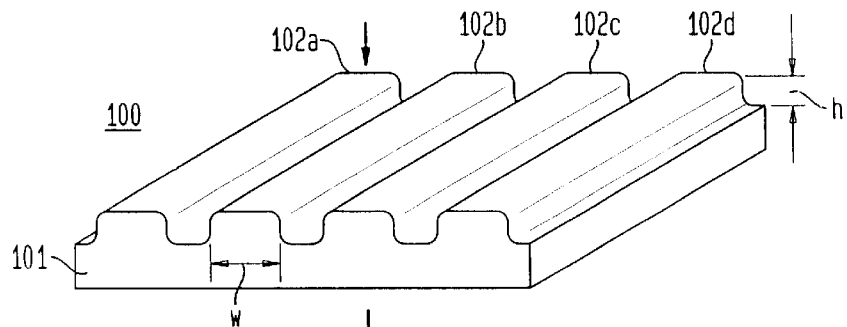
FIGS. 2A–2E schematically a planar waveguide structure at various steps of the FIG. 1 process.

FIG. 2A illustrates the result of this step on a workpiece comprising bulk disk 100 of core glass. The disk is patterned by wet-etching at selected portions so that it comprises a base portion 101 and a plurality of protruding portion, 102a, 102b, . . . , 102d. This can be achieved by etching various channels in the disk. The protruding portions have a thickness and width corresponding substantially in dimension to the waveguide strips sought to be fabricated. The disk advantageously comprises aluminosilicate glass, but other glasses, such as soda-lime glass may be used. If it is desired that the waveguide structure should be a waveguide amplifier, the waveguide strip material should be doped with a small percentage of rare earth dopants by techniques well known in the art. The preferred rare earth dopant is erbium.

Etchants for wet etching the channels may be selected from HF etchant (~1% HF), $K_4Fe(CN)_6$, $K_3Fe(CN)_6$, $Na_2S_2O_3$, and KOH in $H_2O$. Alternatively, other patterning techniques such as dry etching or microscale imprinting can be used to produce the protruding portions.

Ultimately, the protruding portions or 102a, 102b..., 102d, etc., Will form the waveguide strips of the planar waveguide. Thus, the etching of the channels will be controlled to produce protruding portions having the desired dimensions. Protruding portions having a height (thickness) and/or width dimension of greater than 5 µm may be formed. Preferably the channels are etched such that the protruding portions have a height h in the range of 10–20 µm and a width w in the range of 50–100 µm.

A third step shown in Block C of FIG. 1 is to deposit a cladding layer on the surface of the protruding portion(s). The cladding layer can be silica deposited by conventional techniques well known in the art. It is preferably deposited by the BPTEOS process.

Figure 2B:
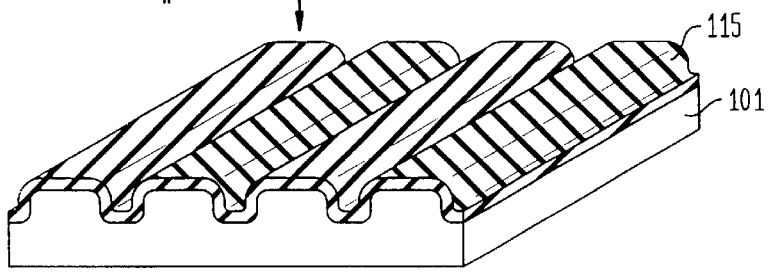

Referring to FIG. 2B, a cladding layer 115 is 'shown deposited over the etched bulk glass, filling the channels. The material for this cladding layer will be selected depending on the waveguide strip material. The cladding material should have a lower index of refraction than the strip material. Silica cladding, material can be used with aluminosilicate strip material. A plastic cladding may be used with a soda-lime strip material.

The patterned workpiece with the cladding layer thereon is then attached to a substrate for the planar waveguide (FIG. 1, block D). The cladding layer is attached to the waveguide substrate.

Figure 2C:
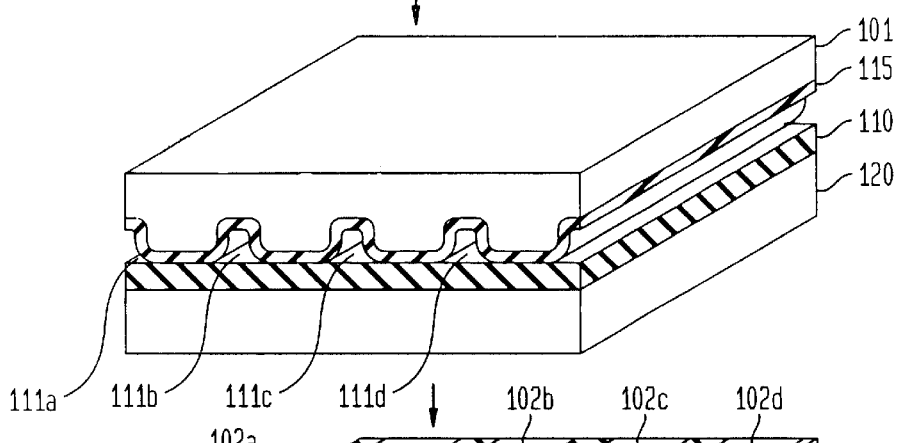

FIG. 2C shows the workpiece 100 inverted and the cladding layer is attached to the waveguide substrate 120. The substrate can be any of a wide variety of materials including glasses, ceramics and semiconductors. Preferably it is silicon. A dielectric or insulating layer 110, such as a layer of silica ($SiO_2$), may be disposed on the surface of between the substrate 120. The workpiece cladding can be attached to the substrate, by molecular bonding, such as with aluminosilicate or silicon, or by other appropriate bonding-agents such as ceramic bakeable pastes. At this stage, the core (protruding portions 102a, 102b, ..., 102d) may be isolated with cladding on three sides and bound to the disk 100 at the fourth side. There is much flexibility in selecting the type of bonding agent because the core is protected from contacting the adhesive. Interstices. 111a, 111b... 111d, between the silica layer 110 and substrate 120 may be filled, if desired, with cladding material.

If the workpiece comprises a thin layer of strip material on a cladding material support, the waveguide is substantially complete. If the layer of strip material is thick or workpiece is a bulk disk of strip material, then the next step (Block E of FIG. 1) is to remove the base portion of the workpiece selectively leaving the protruding portions.

Figure 2D:
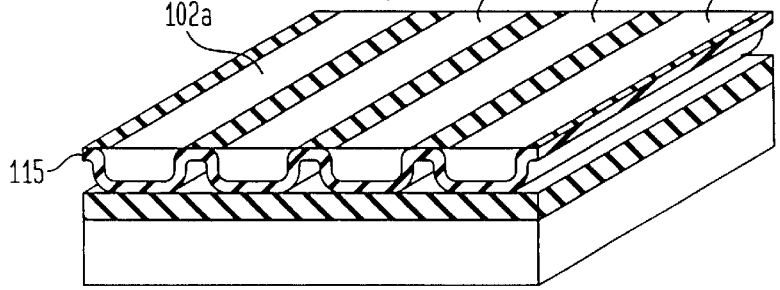

Referring to FIG. 2D, the base of the bulk glass disk 101 may be etched away, leaving the protruding portions 102a, 102b... partially surrounded by cladding layer 115 to comprise planar waveguide strips.

Figure 2E:
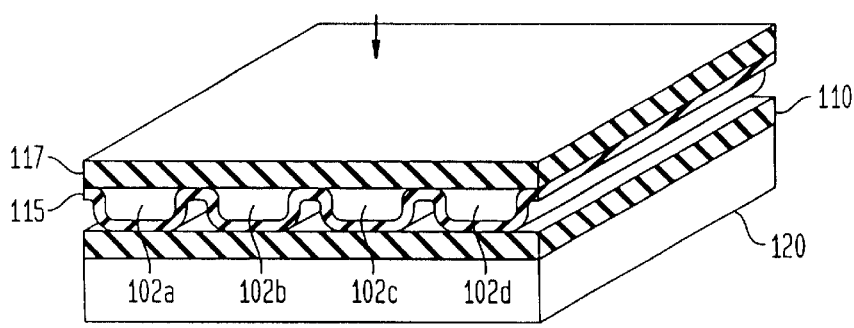

As a further optional final step, a top cladding layer 117 may be deposited over the exposed protruding portions 102a, 102b (FIG. 2E). If desired, the resulting structure may be diced into smaller pieces.

The method of the invention may be used to fabricate a waveguide structure or waveguide amplifier having waveguide core strips with relatively large dimensions. For example, a waveguide or waveguide amplifier may be made having cross-sectional dimensions of tens of microns, i.e., the height of the waveguide strips may be greater than 5 µm and more preferably in the range of about 10 µm–20 µm or greater. The width of the strips also may be greater than 5 µm and more preferably in the range of about 30 µm–50 µm or greater. Thus, the method allows for the making of planar waveguide structures having larger dimensions than possible with conventional methods. Such a structure is advantageous as it helps to reduce the vertical dimension mismatch between planar waveguides and optical fibers and thereby to reduce the losses that occur when such components are coupled together. The method is also advantageous as it can use wet etching which is faster than the dry etching and deposition techniques conventionally used for producing planar waveguides.

Figure 3:
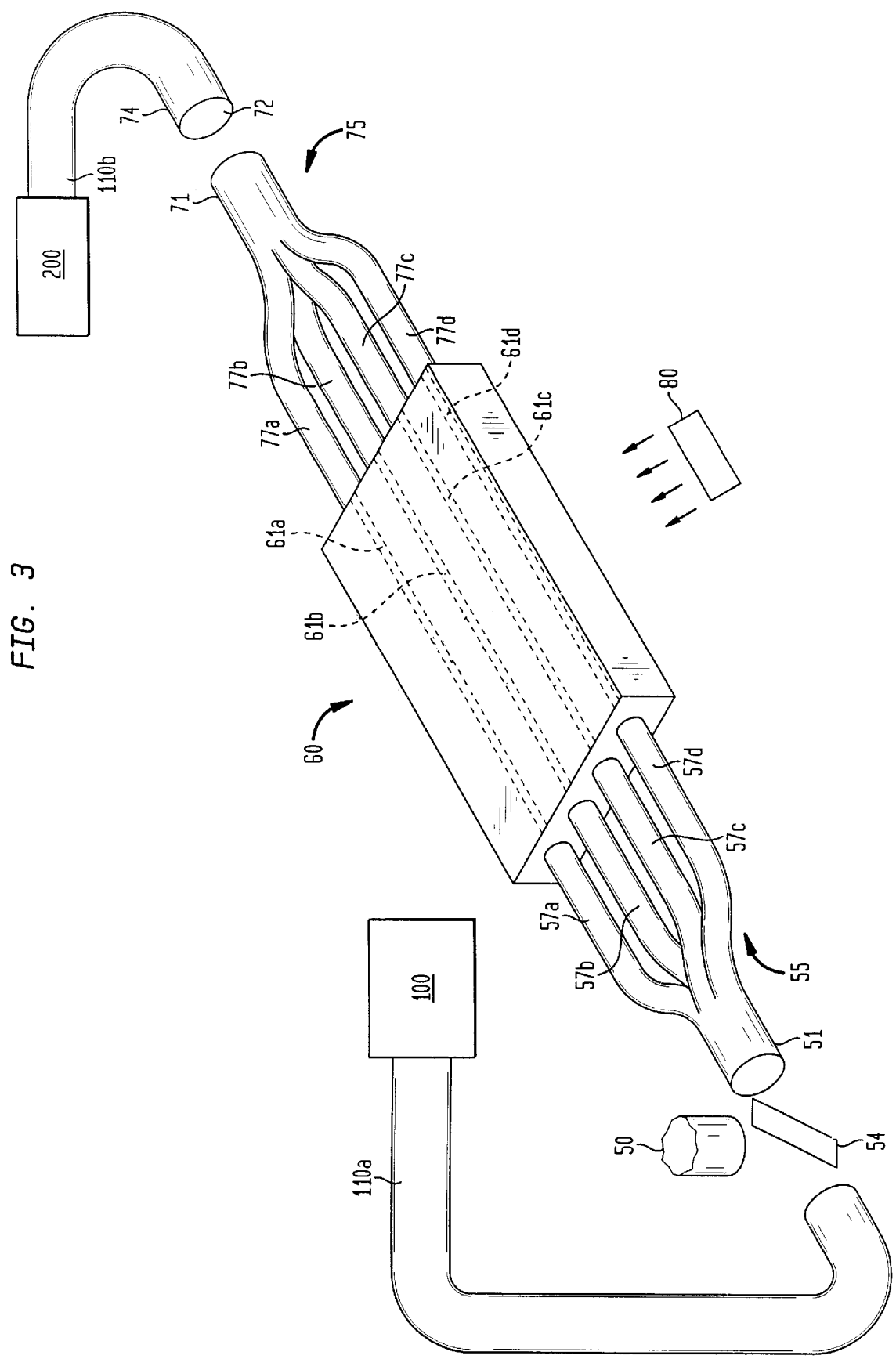
FIG. 3 is a schematic illustration of part of an optical communications system using a planar waveguide structure fabricated by the process of FIG. 1.

FIG. 3 shows a communications system comprising a transmitter 100, an amplifier 60 fabricated by the inventive method, and a detector 200. The amplifier 60 has larger dimensions than planar waveguides made using conventional processing. These dimensions enable more efficient coupling with optical fibers 110a, 110b. Couplers 55, 57 are used to connect the planar waveguide 60 to input 110a and output 110b fibers. Advantageously, these couplers have the configuration, described in co-pending U.S. patent application Ser. No. 09/663,014, entitled "Article Comprising a Multimode Optical Fiber Coupler" filed concomitantly herewith by the present inventor, and assigned to the present assignee. The application is incorporated herein by reference.

More particularly, the couplers 55, 75 each comprise a plurality of fibers with claddings that are tapered from zero thickness at the first ends of the fibers to a final thickness at the second ends (or "cladded ends") of the fibers. At the first ends of the fibers (also referred to herein as the "core exposed ends"), the core is exposed i.e. there is no surrounding cladding. The tapered fibers are arranged so that their core-exposed ends are bundled together. The bundle is preferably formed into a single rod such as by fusion to define bundles 51, 71, respectively, of couplers 55, 75. The bundled, fused ends are coupled to the cores of the optical fibers 110a, 110b, carrying the transmitted signal.

At the input end, a free space combiner 54 is used to combine signals from a pump input fiber 50 and signal input fiber 52 which are directed into the first fiber coupler 55, having bundle 51 at the input end. The plurality of fibers comprising the bundle 51 have claddings that are tapered outward, so that the fibers in the bundle are splayed into individual fibers. 57a, 57b, ..., 57d, and coupled to an array of large dimension waveguide strips 61a, 61b, 61c, 61d of the planar waveguide amplifier 60. The second coupler 75 is connected at the output of the planar waveguide 60 with light from each of the waveguide films being directed into individual splayed fibers 77a, 77b, ..., 77d, that are tapered down into fiber bundle 71. Light from bundle 71 could be directed into output fiber 72 toward receiver 200, and/or a splitter 74 may:be disposed in the output path. The receiver bundle 71 can be optimized independent of the input constraints. According to another aspect of the invention, the receiver bundle 71 is continued as a "fiber bundle transmission line" (not show) to a remote location and/or to the detector. This approach may be advantageous in that smaller cores will produce less dispersion than larger cores, as they support fewer modes.

The cores of the optical fibers 110a, 110b, may be relatively large, e.g., greater than 50 µm, and multimode collection fibers may be used and coupled to the planar waveguide amplifier. Yet, there is little or no loss with this configuration. The number of fibers used in the bundles, the dimensions of the fiber cores and planar waveguides, the degree of taper, the composition of the components, and other design considerations may be adjusted depending on the application as one skilled in the field would appreciate.

In matching the coupler with the planar waveguides and/or multimode fiber a matching consideration is that the cross-sectional area of the core, times the square of the numerical aperture, optimally should be the same on both sides of a juncture. In other if "A" denotes the cross-sectional core area for signal input or output and NA is the numerical aperture, then $A \times (NA)^2$ should be substantially constant throughout the system.

The invention is advantageous in that planar waveguides may be more efficiently fabricated and also, they may made with larger dimensions' to reduce the vertical dimension mismatches and allow for coupling of planar waveguides with multimode collection fibers and other large core fibers. Planar waveguide amplifiers may be more highly doped than optical fiber amplifiers. Additionally, in multimode applications, dispersion is an important factor as an increase in modes results in greater dispersion. With this invention, there is no modal noise penalty in the amplifier, beyond the modal dispersion in the individual waveguides, which is small, given the dimensions of the waveguides. Additionally, with the invention an increase in the input image size does not impact upon (e.g., cause or increase) a modal noise penalty. By providing low-dispersion optical amplification, the invention increases the flexibility of the system with regard to use of photodetectors. Using conventional systems, avalanche diodes are too slow for 10 Gbit/sec detection (per channel), and while PIN diodes are fast enough, they are not sufficiently sensitive. Low-dispersion optical amplification addresses these problems with conventional systems by enabling use of avalanche diodes as photodetectors.

With this invention, the amplification of individual waveguides 61a ... 61d may be manipulated to compensate for or create possible patterns in the image. Also, the planar waveguides may be structured to reduce dispersion. It is beneficial to utilize a narrower core in the planar waveguides (i.e., in the height dimension parallel to the substrate surface and transverse to the propagation direction), to support fewer modes and hence, cause less dispersion. The waveguide amplifier structure 60 may be pumped in a cladding-pumping mode from the side by one or more extended cavity laser pumps schematically illustrated at boxed region 80 (FIG. 3). This edge-pumping scheme may be helpful in increasing pumping efficiency—the pumping efficiency of planar waveguides is typically lower than that of optical fibers. The cladding of the planar waveguide may be so shaped and dimensioned as to confine the edge-pumped radiation, e.g., it may be a ring-shaped or serpentine cladding arrangement.

It is understood that the embodiments described herein are merely exemplary and that a person skilled in the art may make variations and modifications without departing from the spirit and scope of the invention. All such variations and modifications are intended to be included within the scope of the appended claims.

I claim:

1. A method for making a planar waveguide comprising a waveguide strip on a waveguide substrate, the method comprising the steps of:

providing a workpiece comprising a layer of material suitable for use as the planar waveguide strip;

patterning the layer so that the workpiece comprises a base portion and at least one protruding portion, wherein the protruding portion corresponds substantially in dimension to the waveguide strip to be fabricated;

forming a cladding layer on the workpiece overlying the protruding portion;

attaching the cladding layer to the substrate; and further comprising the step of removing the base portion of the workpiece after attaching the cladding layer to the substrate.

2. A method for making a planar waveguide comprising a waveguide strip on a waveguide substrate, the method comprising the steps of:

providing a workpiece comprising a layer of aluminosilicate suitable for use as the planar waveguide strip;

patterning the layer so that the workpiece comprises a base portion and at least one protruding portion, wherein the protruding portion corresponds substantially in dimension to the waveguide strip to be fabricated;

forming a cladding layer on the workpiece overlying the protruding portion;

attaching the cladding layer to the substrate; and wherein the layer of waveguide strip material comprises aluminosilicate.

3. A method for making a planar waveguide comprising a waveguide strip on a waveguide substrate, the method comprising the steps of:

providing a workpiece comprising a layer of material suitable for use as the planar waveguide strip;

patterning the layer so that the workpiece comprises a base portion and at least one protruding portion, wherein the patterning step comprises wet etching and wherein the protruding portion corresponds substantially in dimension to the waveguide strip to be fabricated;

forming a cladding layer on the workpiece overlying the protruding portion;

attaching the cladding layer to the substrate; and wherein the patterning step comprises wet etching.

4. A method for making a planar waveguide comprising a waveguide strip on a waveguide substrate, the method comprising the steps of:

providing a workpiece comprising a layer of material suitable for use as the planar waveguide strip;

patterning the layer so that the workpiece comprises a base portion and at least one protruding portion, wherein the protruding portion corresponds substantially in dimension to the waveguide strip to be fabricated;

forming a cladding layer on the workpiece overlying the protruding portion;

attaching the cladding layer to the substrate; and wherein the patterning step comprises etching portions of the waveguide strip layer to define at least one protruding portion having both height and width dimensions of greater than 5 $\mu$m.

5. The method of claim 4 wherein the substrate comprises a dielectric layer and the cladding layer is attached to the dielectric layer.

6. The method of claim 4 wherein the dielectric layer comprises silica.

7. An optical communications system including a planar waveguide fabricated according to claim 4.

8. A method for making a planar waveguide comprising a waveguide strip on a waveguide substrate, the method comprising the steps of:

providing a workpiece comprising a layer of material suitable for use as the planar waveguide strip;

patterning the layer so that the workpiece comprises a base portion and at least one protruding portion, wherein the protruding portion corresponds substantially in dimension to the waveguide strip to be fabricated;

forming a cladding layer on the workpiece overlying the protruding portion;

attaching the cladding layer to the substrate; and wherein the patterning comprises etching portions of the waveguide strip layer to define at least one protruding portion having both height and width dimensions greater than 10 $\mu$m.

9. A method for making a planar waveguide comprising a waveguide strip on a waveguide substrate, the method comprising the steps of:

providing a workpiece comprising a layer of material suitable for use as the planar waveguide strip;

patterning the layer so that the workpiece comprises a base portion and at least one protruding portion, wherein the protruding portion corresponds substantially in dimension to the waveguide strip to be fabricated;

forming first and second cladding layers on the workpiece overlying the protruding portion; and attaching the cladding to the substrate.

10. A method for making a planar waveguide structure comprising the steps of:

providing a bulk disk of a material suitable for use as the planar waveguide strip;

etching selected portions of the disk so that the disk comprises a base portion and at least one protruding portion, wherein the protruding portion corresponds substantially in dimension to the waveguide strip:

forming a first cladding layer on the top surface of the protruding portion;

attaching the first cladding layer to a substrate; and removing the base portion of the bulk disk.

11. The method of claim 10 wherein the bulk disk comprises glass doped with a rare earth dopant.

12. The method of claim 10, further comprising a step of depositing a second cladding layer over the protruding portion.

13. An optical communications system including a planar waveguide fabricated according to claim 10.

* * * * *